(12) United States Patent
Yin et al.

(10) Patent No.: US 10,091,639 B2
(45) Date of Patent: Oct. 2, 2018

(54) REGISTRATION AREA DETERMINING METHOD AND MOBILITY MANAGEMENT ENTITY

(71) Applicant: Huawei Technologies Co., Ltd., Shenzhen, Guangdong (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/599,756

(22) Filed: May 19, 2017

(65) Prior Publication Data
US 2017/0257752 A1 Sep. 7, 2017

Related U.S. Application Data

(63) Continuation of application No. PCT/CN2015/080289, filed on May 29, 2015.

(30) Foreign Application Priority Data

Nov. 20, 2014 (CN) .......................... 2014 1 0668532

(51) Int. Cl.
*H04W 4/00* (2018.01)
*H04W 8/04* (2009.01)
(Continued)

(52) U.S. Cl.
CPC ......... *H04W 8/04* (2013.01); *H04W 28/0226* (2013.01); *H04W 60/04* (2013.01); *H04W 68/02* (2013.01); *H04W 88/02* (2013.01)

(58) Field of Classification Search
CPC .............................. H04W 76/02; H04W 88/06
(Continued)

(56) References Cited

U.S. PATENT DOCUMENTS

| 9,049,609 | B1 * | 6/2015 | Reeves ................. H04W 24/02 |
| 2003/0092439 | A1 | 5/2003 | D'Herbemont et al. |

(Continued)

FOREIGN PATENT DOCUMENTS

| CN | 101541081 A | 9/2009 |
| CN | 101861719 A | 10/2010 |

(Continued)

*Primary Examiner* — Kiet Doan (57) ABSTRACT

Embodiments of the present disclosure disclose a registration area determining method, to reduce overheads for sending paging signaling to user equipment. The method in the embodiments of the present disclosure includes: determining, by a mobility management entity, that both duration in which user equipment does not access a basic registration area in a registration area of the user equipment and duration in which the user equipment does not initiate a periodic basic registration area update procedure are greater than or equal to preset duration; generating, by the mobility management entity, a new registration area for the user equipment, where the new registration area does not include the basic registration area; and sending, by the mobility management entity, the new registration area to the user equipment. The embodiments of the present disclosure further provide a mobility management entity, to reduce the overheads for sending paging signaling to the user equipment.

14 Claims, 6 Drawing Sheets

(51) Int. Cl.
*H04W 60/04* (2009.01)
*H04W 68/02* (2009.01)
*H04W 28/02* (2009.01)
*H04W 88/02* (2009.01)

(58) Field of Classification Search
USPC ......... 455/439, 446, 435.1, 453, 410, 456.5, 455/434; 370/331, 338
See application file for complete search history.

(56) References Cited

U.S. PATENT DOCUMENTS

| | | | |
|---|---|---|---|
| 2010/0056175 A1* | 3/2010 | Bachmann | H04W 8/08 455/456.1 |
| 2010/0279697 A1 | 11/2010 | Yang et al. | |
| 2011/0261715 A1 | 10/2011 | Norefors et al. | |
| 2013/0203415 A1 | 8/2013 | Arvidsson et al. | |
| 2015/0365851 A1 | 12/2015 | Wang et al. | |

FOREIGN PATENT DOCUMENTS

| | | |
|---|---|---|
| CN | 103733660 A | 4/2014 |
| CN | 103747526 A | 4/2014 |
| CN | 104010324 A | 8/2014 |
| CN | 104507067 A | 4/2015 |
| WO | 2013085242 A1 | 6/2013 |

* cited by examiner

REGISTRATION AREA DETERMINING METHOD AND MOBILITY MANAGEMENT ENTITY

CROSS-REFERENCE TO RELATED APPLICATIONS

This application is a continuation of International Application No. PCT/CN2015/080289, filed on May 29, 2015, which claims priority to Chinese Patent Application No. 201410668532.2, filed on Nov. 20, 2014. The disclosures of the aforementioned applications are hereby incorporated by reference in their entireties.

TECHNICAL FIELD

The present application relates to the field of communications technologies, and in particular, to a registration area determining method and a mobility management entity.

BACKGROUND

In an Enhanced Packet System (EPS), a registration area is referred to as a Tracking Area List (TA List) and includes one or more basic registration areas (that is, tracking areas). The tracking area may be considered to be similar to a routing area in a Wideband Code Division Multiple Access (WCDMA) packet domain. A Mobility Management Entity (MME) allocates a registration area to user equipment. When there is no signaling connection between the user equipment and a network, that is, the user equipment is in an idle state, the mobility management entity may send paging signaling to the user equipment in the registration area, to enable the user equipment to establish a signaling connection to the network, that is, to enable the user equipment to switch to a connected state. However, when the user equipment moves outside the registration area, because the mobility management entity cannot page the user equipment in the original registration area, a signaling connection between the user equipment and the network cannot be established.

In the prior art, the foregoing problem is resolved by reallocating a registration area. Specifically, when user equipment moves outside a registration area, the user equipment sends a tracking area update request message to a mobility management entity, and sends, to the mobility management entity, a tracking area currently accessed by the user equipment and a tracking area accessed by the user equipment in the last time. The mobility management entity reallocates a registration area to the user equipment, and the registration area includes at least the tracking area in which the user equipment is currently located.

However, in the registration area reallocated by the mobility management entity to the user equipment, some tracking areas are not accessed by the user equipment in a particular time. For some user terminals that are busy with services and are paged for many times, each time the mobility management entity sends, in the tracking areas that are not accessed, a paging signaling message to user equipment, a network paging signaling message is wasted.

SUMMARY

Embodiments of the present disclosure provide a registration area determining method, to reduce overheads for sending paging signaling.

A first aspect of the embodiments of the present disclosure provides a registration area determining method, including:

determining, by a mobility management entity, that both duration in which user equipment does not access a basic registration area in a registration area of the user equipment and duration in which the user equipment does not initiate a periodic basic registration area update procedure are greater than or equal to preset duration;

generating, by the mobility management entity, a new registration area for the user equipment, where the new registration area does not include the basic registration area; and sending, by the mobility management entity, the new registration area to the user equipment.

With reference to the first aspect of the embodiments of the present disclosure, in a first implementation manner of the first aspect of the embodiments of the present disclosure, the generating, by the mobility management entity, a new registration area for the user equipment includes:

deleting, by the mobility management entity, the basic registration area from the registration area, to obtain the new registration area.

With reference to the first aspect of the embodiments of the present disclosure or the first implementation manner of the first aspect, in a second implementation manner of the first aspect of the embodiments of the present disclosure, the determining, by a mobility management entity, that both duration in which user equipment does not access a basic registration area in a registration area of the user equipment and duration in which the user equipment does not initiate a periodic basic registration area update procedure are greater than or equal to preset duration includes:

if the mobility management entity does not receive, in the preset duration starting from a time when the mobility management entity allocates the registration area to the user equipment, a signaling message sent by the user equipment in the basic registration area or a periodic basic registration area update request message sent by the user equipment, determining that both the duration in which the user equipment does not access the basic registration area and the duration in which the user equipment does not initiate the periodic basic registration area update procedure are greater than or equal to the preset duration.

With reference to the first aspect of the embodiments of the present disclosure, or the first implementation manner of the first aspect, or the second implementation manner of the first aspect, in a third implementation manner of the first aspect of the embodiments of the present disclosure, the determining, by a mobility management entity, that both duration in which user equipment does not access a basic registration area in a registration area of the user equipment and duration in which the user equipment does not initiate a periodic basic registration area update procedure are greater than or equal to preset duration includes:

starting a timer when the mobility management entity allocates the registration area to the user equipment; and if the mobility management entity does not receive, from a time when the timer is started to a time when timing duration of the timer reaches the preset duration, the signaling message sent by the user equipment in the basic registration area or the periodic basic registration area update request message sent by the user equipment, determining that both the duration in which the user equipment does not access the basic registration area and the duration in which the user equipment does not initiate the periodic basic registration area update procedure are greater than or equal to the preset duration.

With reference to the third implementation manner of the first aspect of the embodiments of the present disclosure, in a fourth implementation manner of the first aspect of the embodiments of the present disclosure, the method includes:

restarting the timer when the timing duration of the timer reaches the preset duration.

With reference to the first aspect of the embodiments of the present disclosure or the first implementation manner of the first aspect, in a fifth implementation manner of the first aspect of the embodiments of the present disclosure, that the user equipment does not initiate a periodic basic registration area update procedure includes:

the user equipment is in a connected state; or the user equipment switches between a connected state and an idle state.

A second aspect of the embodiments of the present disclosure provides a mobility management entity, including:

a processing unit, configured to: determine that both duration in which user equipment does not access a basic registration area in a registration area of the user equipment and duration in which the user equipment does not initiate a periodic basic registration area update procedure are greater than or equal to preset duration, and generate a new registration area for the user equipment, where the new registration area does not include the basic registration area; and a sending unit, configured to send the new registration area to the user equipment.

With reference to the first aspect of the embodiments of the present disclosure, in a first implementation manner of the first aspect of the embodiments of the present disclosure, the processing unit is specifically configured to delete the basic registration area from the registration area, to obtain the new registration area.

With reference to the second aspect of the embodiments of the present disclosure or the first implementation manner of the second aspect, in a second implementation manner of the second aspect of the embodiments of the present disclosure, the processing unit is specifically configured to: if the processing unit does not receive, in the preset duration starting from a time when the processing unit allocates the registration area to the user equipment, a signaling message sent by the user equipment in the basic registration area or a periodic basic registration area update request message sent by the user equipment, determine that both the duration in which the user equipment does not access the basic registration area and the duration in which the user equipment does not initiate the periodic basic registration area update procedure are greater than or equal to the preset duration.

With reference to the second aspect of the embodiments of the present disclosure, or the first implementation manner of the second aspect, or the second implementation manner of the second aspect, in a third implementation manner of the second aspect of the embodiments of the present disclosure, the processing unit is specifically configured to: start a timer when the processing unit allocates the registration area to the user equipment; and if the signaling message sent by the user equipment in the basic registration area or the periodic basic registration area update request message sent by the user equipment is not received from a time when the timer is started to a time when timing duration of the timer reaches the preset duration, determine that both the duration in which the user equipment does not access the basic registration area and the duration in which the user equipment does not initiate the periodic basic registration area update procedure are greater than or equal to the preset duration.

With reference to the third implementation manner of the second aspect of the embodiments of the present disclosure, in a fourth implementation manner of the second aspect of the embodiments of the present disclosure, the processing unit is further configured to restart the timer when the timing duration of the timer reaches the preset duration.

With reference to the second aspect of the embodiments of the present disclosure or the first implementation manner of the second aspect, in a fifth implementation manner of the second aspect of the embodiments of the present disclosure, that the user equipment does not initiate a periodic basic registration area update procedure includes:

the user equipment is in a connected state; or the user equipment switches between a connected state and an idle state.

A third aspect of the embodiments of the present disclosure provides a mobility management entity, including a processor, a memory, a bus, and a communications interface, where:

the memory is configured to store a computer execution instruction, the processor and the memory are connected by using the bus, and when the mobility management entity runs, the processor executes the computer execution instruction stored in the memory, so that the mobility management entity performs the registration area determining method according to any one of the first aspect, or the possible implementation manners of the first aspect.

A fourth aspect of the embodiments of the present disclosure provides a computer readable medium, including a computer execution instruction, so that when a processor of a computer executes the computer execution instruction, the computer performs the registration area determining method according to any one of the first aspect, or the possible implementation manners of the first aspect.

The embodiments of the present disclosure have the following advantages:

After a mobility management entity determines that duration in which user equipment does not access a tracking area and duration in which the user equipment does not initiate a periodic basic registration area update procedure are greater than or equal to preset duration, the mobility management entity generates a new registration area that does not include the basic registration area. Therefore, the mobility management entity may not need to send paging signaling to the user equipment in the tracking area, and overheads for sending a paging signaling message are reduced.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

Figure 1:
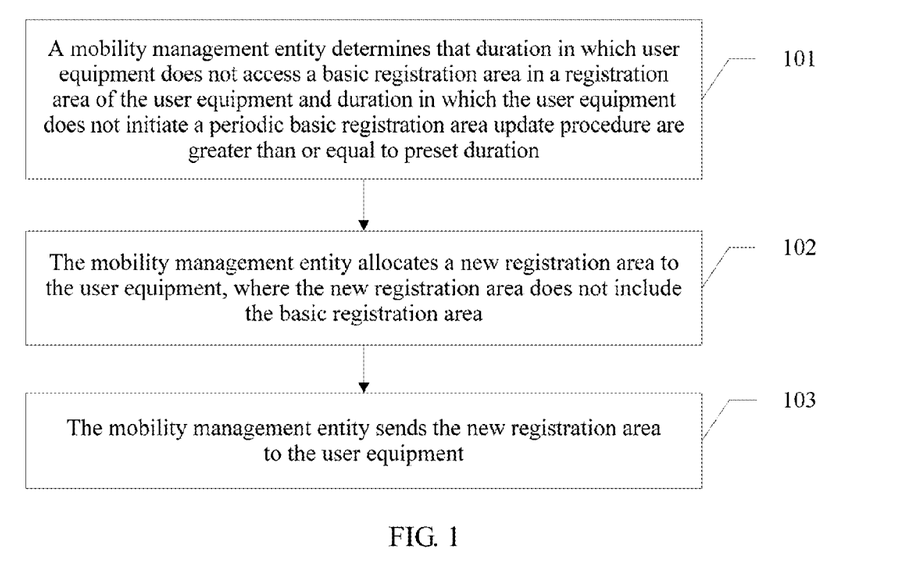
FIG. 1 is a flowchart of a registration area determining method according to an embodiment of the present disclosure.

Referring to FIG. 1, a registration area determining method provided in Embodiment 1 of the present disclosure includes the following steps.

101. A mobility management entity determines that both duration in which user equipment does not access a basic registration area in a registration area of the user equipment and duration in which the user equipment does not initiate a periodic basic registration area update procedure are greater than or equal to preset duration.

In an evolved packet system (EPS), a registration area is referred to as a tracking area list (TA List) and includes one or more TAs. A mobility management entity allocates a registration area to user equipment, and the user equipment can access each basic registration area, that is, each tracking area, in the registration area. However, some basic registration areas in the registration area are not accessed by the user equipment in a particular time. The mobility management entity may determine whether the duration in which the user equipment does not access the basic registration area in the registration area and the duration in which the user equipment does not initiate the periodic basic registration area update procedure are greater than or equal to the preset duration, and if yes, perform step 102.

Optionally, the mobility management entity determines, in the preset duration starting from a time when the mobility management entity allocates the registration area to the user equipment, whether a signaling message sent by the user equipment in the basic registration area and a periodic basic registration area update request message sent by the user equipment are received. If the messages are not received, it is determined that both the duration in which the user equipment does not access the basic registration area and the duration in which the user equipment does not initiate the periodic basic registration area update procedure are greater than or equal to the preset duration.

For example, the mobility management entity may start a timer when the mobility management entity allocates the registration area to the user equipment. If the mobility management entity does not receive, from a time when the timer is started to a time when timing duration of the timer reaches the preset duration, the signaling message sent by the user equipment in the basic registration area or the periodic basic registration area update request message sent by the user equipment, the mobility management entity determines that both the duration in which the user equipment does not access the basic registration area and the duration in which the user equipment does not initiate the periodic basic registration area update procedure are greater than or equal to the preset duration. Optionally, the mobility management entity may restart the timer when the timing duration of the timer reaches the preset duration, to repeat the foregoing determining process. That is, the mobility management entity determines whether the signaling message sent by the user equipment in the basic registration area or the periodic basic registration area update request message sent by the user equipment is received from a time when the timer is restarted to a time when the timing duration of the timer reaches the preset duration.

In addition, the timer may be restarted if the signaling message sent by the user equipment in the basic registration area or the periodic basic registration area update request message sent by the user equipment is received from the time when the timer is started to the time when the timing duration of the timer reaches the preset duration, to repeat the foregoing determining process. Alternatively, the timer may be restarted when it is determined that both the duration in which the user equipment does not access the basic registration area and the duration in which the user equipment does not initiate the periodic basic registration area update procedure are greater than or equal to the preset duration, to repeat the foregoing determining process.

102. The mobility management entity allocates a new registration area to the user equipment, where the new registration area does not include the basic registration area.

After the mobility management entity determines that the duration in which the user equipment does not access the basic registration area in the registration area of the user equipment and the duration in which the user equipment does not initiate the periodic basic registration area update procedure are greater than or equal to the preset duration, the mobility management entity allocates the new registration area to the user equipment, and the new registration area does not include the basic registration area. For example, the mobility management entity deletes the basic registration area from the registration area, to obtain the new registration area.

103. The mobility management entity sends the new registration area to the user equipment.

After the mobility management entity allocates the new registration area, the mobility management entity sends the new registration area to the user equipment.

In this embodiment of the present disclosure, after determining that duration in which user equipment does not access a basic registration area is greater than or equal to preset duration, and that duration in which the user equipment does not initiate a periodic basic registration area update procedure is greater than or equal to the preset duration, a mobility management entity allocates, to the user equipment, a new registration area that does not include the basic registration area. Therefore, the mobility management entity may not need to send paging signaling to the user equipment in the basic registration area, and paging signaling message overheads are reduced.

Figure 2A:
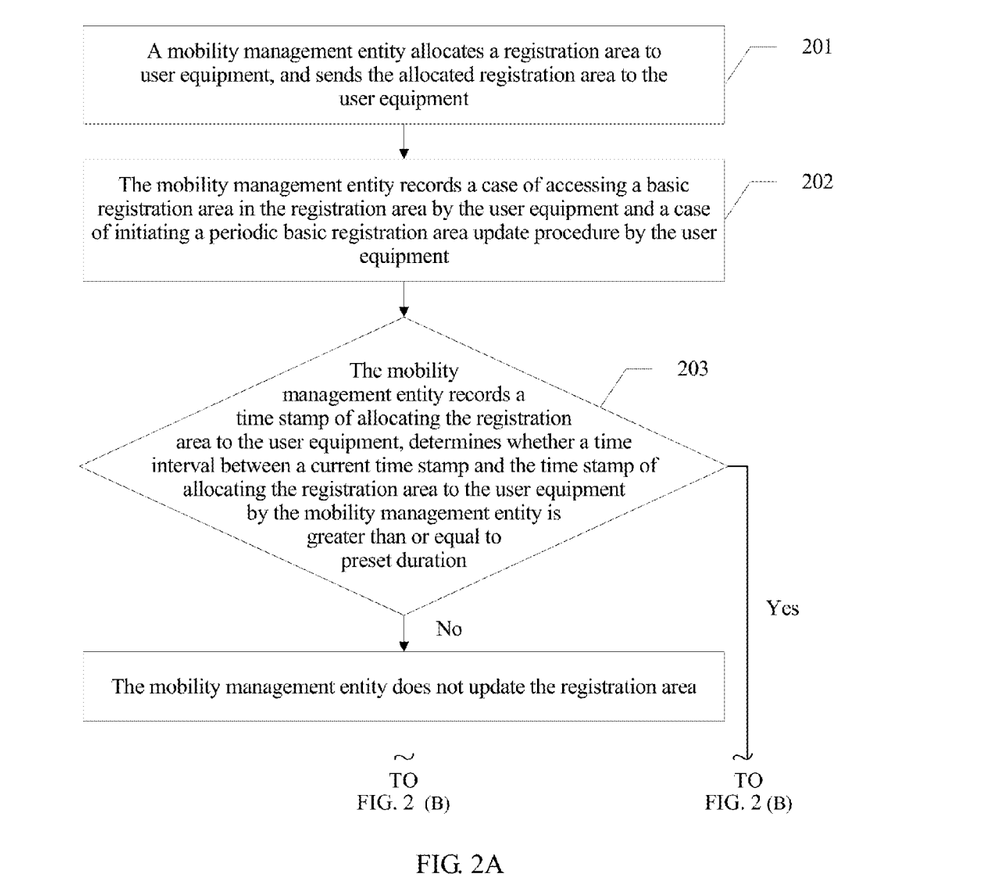
FIG. 2A and FIG. 2B are a flowchart of another registration area determining method according to an embodiment of the present disclosure.
Figure 2B:
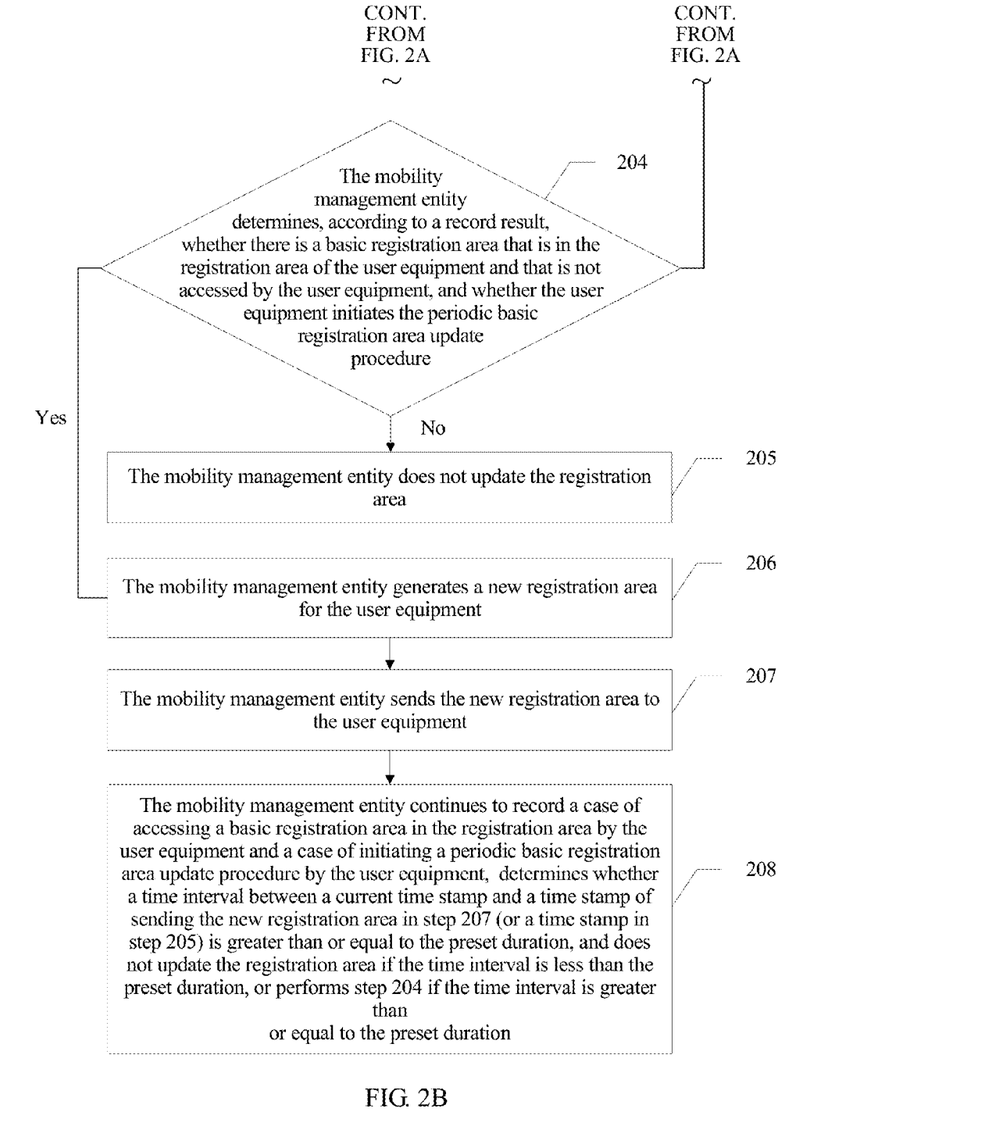

Referring to FIG. 2A and FIG. 2B, a registration area determining method provided in Embodiment 2 of the present disclosure includes the following steps.

201. A mobility management entity allocates a registration area to user equipment, and sends the allocated registration area to the user equipment.

The registration area includes one or more basic registration areas. The mobility management entity may further record a time stamp (that is, a time point) of sending the registration area to the user equipment.

202. The mobility management entity records a case of accessing a basic registration area in the registration area by the user equipment and a case of initiating a periodic basic registration area update procedure by the user equipment.

Specifically, the mobility management entity may collect statistics of a record of accessing the basic registration area in the registration area by the user equipment and a record of initiating the periodic basic registration area update procedure by the user equipment. In an EPS network, the periodic basic registration area update procedure may be a periodic tracking area update procedure.

Whether the user equipment has accessed a basic registration area in the registration area may be determined by determining whether the user equipment initiates a signaling procedure in the basic registration area. Whether the user equipment initiates a periodic basic registration area update procedure may be determined by determining whether the user equipment sends a periodic basic registration area update request message to the mobility management entity. Generally, when duration in which the user equipment is in an idle state exceeds duration of a periodic basic registration area update timer, the user equipment needs to initiate the periodic basic registration area update procedure. If the user equipment does not initiate the periodic basic registration area update procedure in preset duration, it indicates that the user equipment is busy with services, and the user equipment may be always in a connected state, or may frequently switch between a connected state and an idle state. Therefore, the preset duration in step 203 is usually greater than the duration of the periodic basic registration area update timer.

For example, an access identifier of a basic registration area that is in the registration area and that has been accessed by the user equipment may be set to 'yes', and an access identifier of a basic registration area that has not been accessed by the user equipment may be set to 'no'. If the user equipment initiates the periodic basic registration area update procedure, a periodic basic registration area update identifier in a user equipment context is set to 'yes'. If the user equipment does not initiate the periodic basic registration area update procedure, the periodic basic registration area update identifier is set to 'no'.

Optionally, when collecting, in the preset duration, statistics of the record of accessing the basic registration area in the registration area by the user equipment, the mobility management entity may collect statistics of a record of accessing each basic registration area in the registration area by the user equipment.

203. The mobility management entity records a time stamp of allocating the registration area to the user equipment, determines whether a time interval between a current time stamp and the time stamp of allocating the registration area to the user equipment by the mobility management entity is greater than or equal to preset duration, and does not update the registration area if the time interval is less than the preset duration, or performs step 204 if the time interval is greater than or equal to the preset duration, where the preset duration is twice duration of a periodic basic registration area update timer.

The mobility management entity may determine, periodically or in real time, whether the time interval between the current time stamp (that is, a current time point) and the time stamp of allocating the registration area to the user equipment by the mobility management entity is greater than or equal to the preset duration. For example, the mobility management entity may start a timer when allocating the registration area to the user equipment. If timing duration of the timer does not reach the preset duration, the registration area is not updated. If the timing duration of the timer reaches or exceeds the preset duration, step 204 is performed, to update the registration area. Optionally, the preset duration may be locally configured in advance, or may be obtained from another network element such as a Home Subscriber Sever (HSS), a Policy & Charging Rule Function (PCRF), or a Packet Data Network Gateway (P-GW).

204. The mobility management entity determines, according to a record result, whether there is a basic registration area that is in the registration area of the user equipment and that is not accessed by the user equipment, and whether the user equipment initiates the periodic basic registration area update procedure; and if there is a basic registration area that is in the registration area and that is not accessed by the user equipment, and the user equipment does not initiate the periodic basic registration area update procedure, performs step 206; or otherwise, performs step 205.

For clearer understanding by persons skilled in the art, the following example is used for a more detailed description. For ease of description, a basic registration area is referred to as a TA for short in the following, and a registration area is referred to as a TA list for short. A specific description is as follows.

It is assumed that TAs in a TA list received by the user equipment are a TA 1 to a TA 3 and are shown in Table 1.

TABLE 1

| Basic registration area |
| --- |
| TA 1 |
| TA 2 |
| TA 3 |

After receiving the TA list, the user equipment initiates a signaling procedure to the mobility management entity. The signaling procedure indicates that the user equipment is currently in the TA 1. The signaling procedure may be a service request procedure, a registration area update procedure, or the like. The mobility management entity may record a case of accessing each TA in the TA list by the user equipment. For example, the mobility management entity may set an access identifier corresponding to the TA 1 to Y (or yes), and Y indicates that the user equipment has accessed the TA 1. If the user equipment has not accessed the TA 3, an access identifier corresponding to the TA 3 is set to N (or no). Similarly, a record of accessing the TA 2 may be completed. It is assumed that the user equipment has accessed the TA 2, and a record of accessing the TA 1 to the TA 3 in the TA list by the user equipment may be shown in Table 2.

TABLE 2

| Basic registration area | Access identifier |
| --- | --- |
| TA 1 | Y |
| TA 2 | Y |
| TA 3 | N |

After receiving the TA list, the user equipment initiates a periodic tracking area update procedure to the mobility management entity, and sends a periodic tracking area update request to the mobility management entity. The mobility management entity sets a periodic tracking area update identifier in a user equipment context to Y (or yes). If the user equipment does not initiate the periodic tracking area update procedure, the periodic tracking area update identifier is set to N (or no). In this example, as shown in Table 3, the user equipment does not initiate the periodic tracking area update procedure.

TABLE 3

| User context | Periodic tracking area update identifier |
|---|---|
| User equipment 1 | N |

When the mobility management entity determines that the time interval between the current time stamp and the time stamp of allocating the registration area to the user equipment by the mobility management entity is greater than or equal to the preset duration, if an access identifier of the basic registration area is N, and the periodic tracking area update identifier is N, step 206 is performed. If the access identifier of the basic registration area is N and the periodic tracking area update identifier is Y, or the access identifier of the basic registration area is Y and the periodic tracking area update identifier is N, or the access identifier of the basic registration area is Y and the periodic tracking area update identifier is Y, step 205 is performed.

205. The mobility management entity does not update the registration area.

206. The mobility management entity generates a new registration area for the user equipment.

If the periodic tracking area update identifier is N (or no), a basic registration area whose access identifier is N (or no) is deleted from the registration area, to obtain the new registration area.

207. The mobility management entity sends the new registration area to the user equipment.

Specifically, the mobility management entity actively sends a signaling message to the user equipment. The new registration area is sent to the user equipment by using the signaling message. The signaling message may be a Globally Unique Temporary Identifier (GUTI) reallocation command message, or may be another message.

Optionally, after step 205 or step 207, the method may further include the following step:

208. The mobility management entity continues to record a case of accessing a basic registration area in the registration area by the user equipment and a case of initiating a periodic basic registration area update procedure by the user equipment, determines whether a time interval between a current time stamp and a time stamp of sending the new registration area in step 207 (or a time stamp in step 205) is greater than or equal to the preset duration, and does not update the registration area if the time interval is less than the preset duration, or performs step 204 if the time interval is greater than or equal to the preset duration.

Optionally, the mobility management entity may update the access identifier and the periodic basic registration area update identifier to initial values. The initial values may be N (no), or may be other values. Therefore, statistics of a record of accessing each basic registration area in the registration area by the user equipment and a record of initiating the periodic tracking area update procedure by the user equipment are collected again.

The preset duration may be twice the duration of the periodic basic registration area update timer, or may be duration of another type. In this embodiment, the preset duration is twice the duration of the periodic basic registration area update timer.

In this embodiment of the present disclosure, a mobility management entity determines that duration in which user equipment does not access a basic registration area and duration in which the user equipment does not initiate a periodic tracking area update procedure are greater than or equal to preset duration, and the mobility management entity deletes the basic registration area from a registration area, to generate a new registration area that does not include the basic registration area. The mobility management entity may not need to send paging signaling to the user equipment in the basic registration area, so that overheads for sending a paging signaling message are reduced. In addition, because the basic registration area is deleted from the registration area, a quantity of tracking areas included in the new registration area is reduced, so that efficiency of sending paging signaling by the mobility management entity to the new registration area is improved.

Figure 3A:
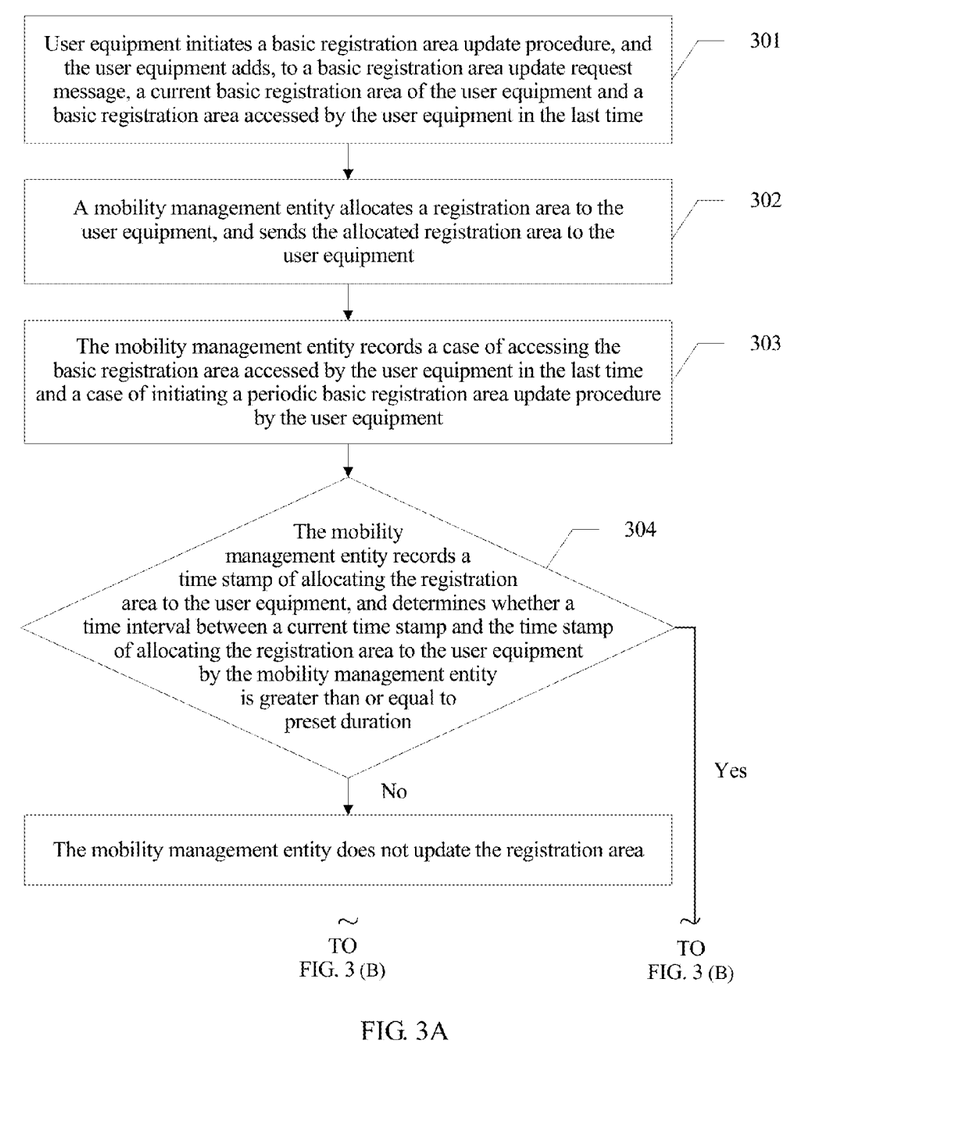
FIG. 3A and FIG. 3B are a flowchart of another registration area determining method according to an embodiment of the present disclosure.
Figure 3B:
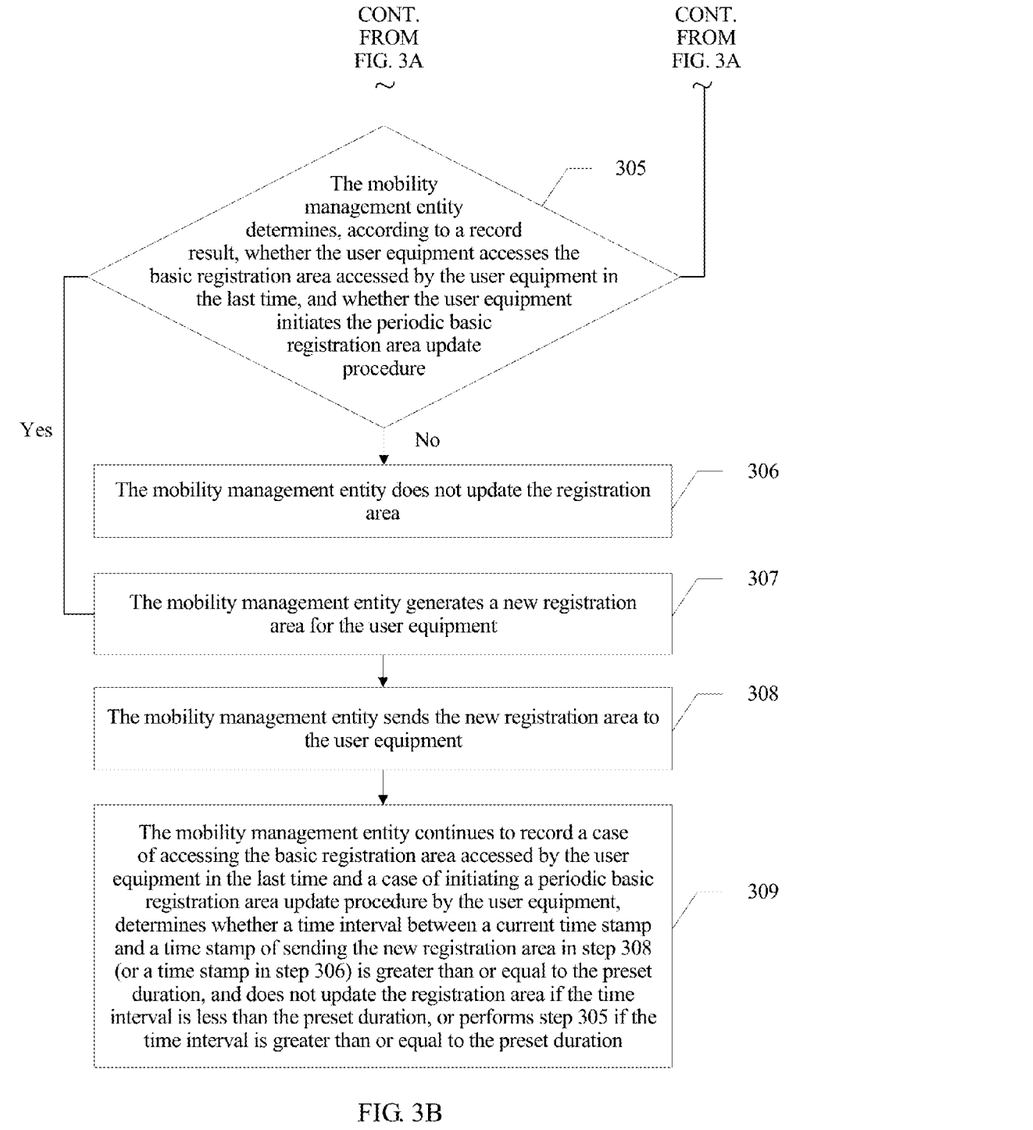

A registration area determining method provided in Embodiment 3 of the present disclosure includes the following steps.

301. User equipment initiates a basic registration area update procedure, and the user equipment adds, to a basic registration area update request message, a current basic registration area of the user equipment and a basic registration area accessed by the user equipment in the last time.

Optionally, the user equipment may further initiate attachment or a periodic basic registration area update procedure, and the user equipment adds, to an attach request or a periodic basic registration area update request message, the current basic registration area of the user equipment and the basic registration area accessed by the user equipment in the last time.

302. A mobility management entity allocates a registration area to the user equipment, and sends the allocated registration area to the user equipment.

The mobility management entity records a time stamp of sending the registration area to the user equipment. The registration area includes the current basic registration area of the user equipment and the basic registration area accessed by the user equipment in the last time, and may further include another basic registration area.

303. The mobility management entity records a case of accessing the basic registration area accessed by the user equipment in the last time and a case of initiating a periodic basic registration area update procedure by the user equipment.

Different from step 202, when collecting statistics of a record of accessing the basic registration area in the registration area by the user equipment, the mobility management entity may collect only statistics of a record of accessing the basic registration area accessed in the last time. For how to collect statistics of the case of initiating the periodic basic registration area update procedure by the user equipment and the case of accessing the basic registration area accessed by the user equipment in the last time, specifically refer to step 202. Details are not described herein in this embodiment of the present disclosure.

304. The mobility management entity records a time stamp of allocating the registration area to the user equipment, determines whether a time interval between a current time stamp and the time stamp of allocating the registration area to the user equipment by the mobility management entity is greater than or equal to preset duration, and does not update the registration area if the time interval is less than the preset duration, or performs step 305 if the time interval is greater than or equal to the preset duration, where the preset duration is twice duration of a periodic basic registration area update timer.

305. The mobility management entity determines, according to a record result, whether the user equipment accesses the basic registration area accessed by the user equipment in the last time, and whether the user equipment initiates the periodic basic registration area update procedure; and if the user equipment does not access the basic registration area accessed by the user equipment in the last time, and the user equipment does not initiate the periodic basic registration area update procedure, performs step 307; or otherwise, performs step 306.

For clearer understanding by persons skilled in the art, the following example is used for a more detailed description. For ease of description, a basic registration area is referred to as a TA for short in the following, and a registration area is referred to as a TA list for short. A specific description is as follows.

It is assumed that the basic registration area update procedure initiated by the user equipment indicates that a current TA is a TA 1, a TA accessed in the last time is a TA 2, and TAs in a TA list received by the user equipment are a TA 1 to a TA 3 and are shown in Table 4.

TABLE 4

| Basic registration area |
| --- |
| TA 1 |
| TA 2 |
| TA 3 |

The mobility management entity collects only statistics of a record of accessing a TA accessed by the user equipment in the last time, that is, the TA 2. After receiving the TA list, the user equipment initiates a signaling procedure to the mobility management entity. The signaling procedure indicates that the user equipment is currently in the TA 2. The signaling procedure may be a service request procedure, a registration area update procedure, or the like. It should be noted that, if the user equipment accesses the TA 2 in the foregoing scenario, it indicates that the TA 2 accessed in the last time has been switched to a current TA of the user equipment. Another TA such as the TA 1 is switched to the TA accessed by the user equipment in the last time. If the user equipment indicates in the foregoing signaling procedure that the TA accessed in the last time is the TA 1, the mobility management entity changes the time stamp into a time of receiving a signaling message from the user equipment, and collects statistics of a record of accessing the TA 1 by the user equipment. In this embodiment, if the user equipment does not access the TA 2, the mobility management entity sets an access identifier corresponding to the TA 2 to N (or no), and N indicates that the user equipment has not accessed the TA 2. A record of accessing the TA, in the TA list, accessed by the user equipment in the last time, that is, the TA 2, may be shown in Table 5.

TABLE 5

| Basic registration area | Access identifier of a TA accessed in the last time |
| --- | --- |
| TA 1 | |
| TA 2 | N |
| TA 3 | |

After receiving the TA list, the user equipment initiates a periodic tracking area update procedure to the mobility management entity, and sends a periodic tracking area update request to the mobility management entity. The mobility management entity sets a periodic tracking area update identifier in a user equipment context to Y (or yes). If the user equipment does not initiate the periodic tracking area update procedure, the periodic tracking area update identifier is set to N (or no). In this example, as shown in Table 6, the user equipment does not initiate the periodic tracking area update procedure.

TABLE 6

| User context | Periodic basic tracking area update identifier |
| --- | --- |
| User equipment 1 | N |

When the mobility management entity determines that the time interval between the current time stamp and the time stamp of allocating the registration area to the user equipment by the mobility management entity is greater than or equal to the preset duration, if an access identifier of the basic registration area accessed in the last time is N, and the periodic tracking area update identifier is N, step 307 is performed. If the access identifier of the basic registration area accessed in the last time is N and the periodic tracking area update identifier is Y, or the access identifier of the basic registration area accessed in the last time is Y and the periodic tracking area update identifier is N, or the access identifier of the basic registration area accessed in the last time is Y and the periodic tracking area update identifier is Y, step 306 is performed.

306. The mobility management entity does not update the registration area.

307. The mobility management entity generates a new registration area for the user equipment.

If the periodic tracking area update identifier is N (or no), a basic registration area that is accessed in the last time and whose access identifier is N (or no) is deleted from the registration area, to obtain the new registration area.

308. The mobility management entity sends the new registration area to the user equipment.

Specifically, the mobility management entity actively sends a signaling message to the user equipment. The new registration area is sent to the user equipment by using the signaling message. The signaling message may be a globally unique temporary identity reallocation command message, or may be another message.

Optionally, after step 306 or step 308, the method may further include the following step:

309. The mobility management entity continues to record a case of accessing the basic registration area accessed by the user equipment in the last time and a case of initiating a periodic basic registration area update procedure by the user equipment, determines whether a time interval between a current time stamp and a time stamp of sending the new registration area in step 308 (or a time stamp in step 306) is greater than or equal to the preset duration, and does not update the registration area if the time interval is less than the preset duration, or performs step 305 if the time interval is greater than or equal to the preset duration.

Optionally, the access identifier and the periodic basic registration area update identifier are updated to initial values. The initial values may be N (no), or may be other values. Therefore, statistics of a record of accessing the basic registration area accessed by the user equipment in the last time and a record of initiating the periodic tracking area update procedure by the user equipment are collected again.

Preset duration for collecting the statistics again may be twice the duration of the periodic basic registration area update timer, or may be duration of another type. In this embodiment, the preset duration for collecting the statistics again is twice the duration of the periodic basic registration area update timer.

In this embodiment of the present disclosure, a mobility management entity determines that duration in which user equipment does not access a basic registration area accessed in the last time and duration in which the user equipment does not initiate a periodic tracking area update procedure are greater than or equal to preset duration, and the mobility management entity deletes the basic registration area accessed in the last time from a registration area, to generate a new registration area that does not include the basic registration area accessed in the last time. The mobility management entity may not need to send paging signaling to the user equipment in the basic registration area accessed in the last time, so that overheads for sending a paging signaling message are reduced. In addition, because the basic registration area accessed in the last time is deleted from the registration area, a quantity of basic registration areas included in the new registration area is reduced, so that efficiency of sending paging signaling by the mobility management entity to the new registration area is improved.

Figure 4:
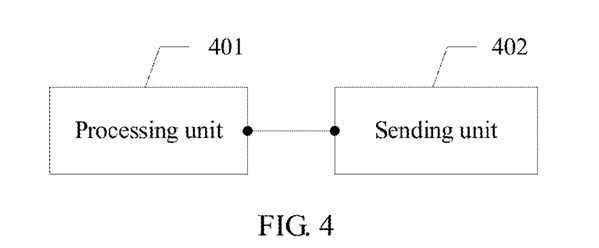
FIG. 4 is a schematic diagram of a mobility management entity according to an embodiment of the present disclosure.

A registration area determining method in embodiments of the present disclosure is described in the foregoing embodiments. Corresponding to the foregoing method embodiments, the embodiments of the present disclosure provides a mobility management entity. Referring to FIG. 4, a mobility management entity provided in Embodiment 4 of the present disclosure includes a processing unit 401 and a sending unit 402.

The processing unit 401 is configured to: determine that duration in which user equipment does not access a basic registration area in a registration area of the user equipment and duration in which the user equipment does not initiate a periodic basic registration area update procedure are greater than or equal to preset duration, and generate a new registration area for the user equipment, where the new registration area does not include the basic registration area.

That the processing unit 401 determines that the duration in which the user equipment does not access the basic registration area in the registration area of the user equipment and the duration in which the user equipment does not initiate the periodic basic registration area update procedure are greater than or equal to the preset duration may be specifically as follows: If the processing unit 401 does not receive, in the preset duration starting from a time when the processing unit 401 allocates the registration area to the user equipment, a signaling message sent by the user equipment in the basic registration area or a periodic basic registration area update request message sent by the user equipment, the processing unit 401 determines that both the duration in which the user equipment does not access the basic registration area and the duration in which the user equipment does not initiate the periodic basic registration area update procedure are greater than or equal to the preset duration. For example, the mobility management entity may start a timer when the processing unit 401 allocates the registration area to the user equipment. If the processing unit 401 does not receive, from a time when the timer is started to a time when timing duration of the timer reaches the preset duration, the signaling message sent by the user equipment in the basic registration area or the periodic basic registration area update request message sent by the user equipment, the processing unit 401 determines that both the duration in which the user equipment does not access the basic registration area and the duration in which the user equipment does not initiate the periodic basic registration area update procedure are greater than or equal to the preset duration.

That the processing unit 401 generates the new registration area for the user equipment may be specifically as follows: The processing unit 401 deletes the basic registration area from the registration area, to generate the new registration area.

Optionally, the processing unit 401 may restart the timer if the signaling message sent by the user equipment in the basic registration area or the periodic basic registration area update request message sent by the user equipment is received from the time when the timer is started to the time when the timing duration of the timer reaches the preset duration, to repeat the foregoing determining process. Alternatively, the processing unit 401 may restart the timer when it is determined that both the duration in which the user equipment does not access the basic registration area and the duration in which the user equipment does not initiate the periodic basic registration area update procedure are greater than or equal to the preset duration, to repeat the foregoing determining process.

The sending unit 402 is configured to send the new registration area to the user equipment.

In this embodiment of the present disclosure, after a processing unit 401 determines that duration in which user equipment does not access a basic registration area in a registration area of the user equipment and duration in which the user equipment does not initiate a periodic basic registration area update procedure are greater than or equal to the preset duration, the mobility management entity generates a new registration area that does not include the basic registration area, so that the mobility management entity may not need to send paging signaling to the user equipment in the basic registration area, and overheads for sending a paging signaling message are reduced. In addition, because the processing unit 401 deletes the basic registration area from the registration area, a quantity of basic registration areas included in the new registration area is reduced, so that efficiency of sending paging signaling by the mobility management entity to the new registration area is improved. Further, the processing unit 401 does not receive, in the preset duration starting from a time when the registration area is allocated to the user equipment, a signaling message sent by the user equipment in the basic registration area or a periodic basic registration area allocation request message sent by the user equipment, so that accuracy of determining that the duration in which the user equipment does not access the basic registration area in the registration area of the user equipment and the duration in which the user equipment does not initiate the periodic basic registration area update procedure are greater than or equal to the preset duration can be improved, and the overheads for sending a paging signaling message are further reduced.

Figure 5:
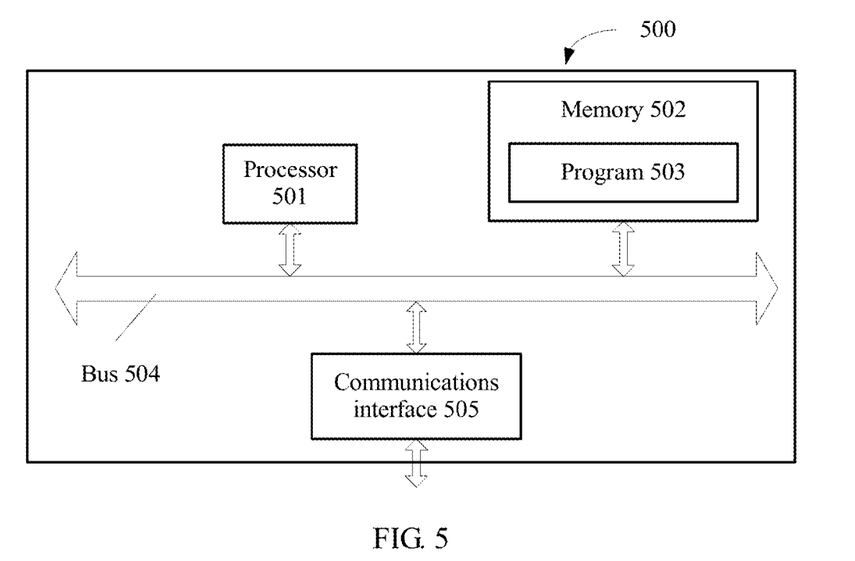
FIG. 5 is a schematic diagram of structural composition of a mobility management entity according to an embodiment of the present disclosure.

As shown in FIG. 5, FIG. 5 shows a mobility management entity provided in an embodiment of the present disclosure. The mobility management entity may include:

a processor 501, a memory 502, a bus 504, and a communications interface 505. The processor 501, the memory 502, and the communications interface 505 are connected by using the bus 504 to communicate with each other.

The processor 501 may be a single-core or multi-core central processing unit, or an application-specific integrated circuit, or may be configured as one or more integrated circuits that implement this embodiment of the present disclosure.

The memory 502 may be a high-speed RAM, or may be a non-volatile memory (non-volatile memory), for example, at least one disk memory.

The memory 502 is configured to store a computer execution instruction 503. Specifically, the computer execution instruction 503 may include program code.

When the apparatus runs, the processor 501 executes the computer execution instruction 503, and can perform the registration area determining method in the method embodiment corresponding to any one of FIG. 1 to FIG. 3A and FIG. 3B.

An embodiment of the present disclosure provides a computer readable medium that includes a computer execution instruction, so that when executing the computer execution instruction, a processor of a computer can perform the registration area determining method in the method embodiment corresponding to any one of FIG. 1 to FIG. 3A and FIG. 3B.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A registration area determining method, comprising:
   determining, by a mobility management entity, that both a duration in which a user equipment does not access a basic registration area in a registration area of the user equipment and a duration in which the user equipment does not initiate a periodic basic registration area update procedure are greater than or equal to a preset duration when the mobility management entity does not receive, in a preset duration starting from a time when the mobility management entity allocates the registration area to the user equipment, a signaling message sent by the user equipment in the basic registration area or a periodic basic registration area update request message sent by the user equipment;
   generating, by the mobility management entity, a new registration area for the user equipment, wherein the new registration area does not comprise the basic registration area; and
   sending, by the mobility management entity, the new registration area to the user equipment.

2. The method according to claim 1, wherein generating, by the mobility management entity, a new registration area for the user equipment comprises:
   deleting, by the mobility management entity, the basic registration area from the registration area, to obtain the new registration area.

3. The method according to claim 1, wherein the user equipment does not initiate a periodic basic registration area update procedure when:
   the user equipment is in a connected state; or
   the user equipment switches between a connected state and an idle state.

4. A registration area determining method, comprising:
   determining, by a mobility management entity, that both a duration in which a user equipment does not access a basic registration area in a registration area of the user equipment and a duration in which the user equipment does not initiate a periodic basic registration area update procedure are greater than or equal to a preset duration by starting a timer when the mobility management entity allocates the registration area to the user equipment, and when the mobility management entity does not receive, from a time when the timer is started to a time when a timing duration of the timer reaches the preset duration, a signaling message sent by the user equipment in the basic registration area or the periodic basic registration area update request message sent by the user equipment;
   generating, by the mobility management entity, a new registration area for the user equipment, wherein the new registration area does not comprise the basic registration area; and sending, by the mobility management entity, the new registration area to the user equipment.

5. The method according to claim 4, further comprising: restarting the timer when the timing duration of the timer reaches the preset duration.

6. The method according to claim 4, wherein generating, by the mobility management entity, a new registration area for the user equipment comprises:
deleting, by the mobility management entity, the basic registration area from the registration area, to obtain the new registration area.

7. The method according to claim 4, wherein the user equipment does not initiate a periodic basic registration area update procedure when:
the user equipment is in a connected state; or
the user equipment switches between a connected state and an idle state.

8. A mobility management entity, comprising:
a processor; and
memory coupled to the processor, the memory comprising instructions that, when executed by the processor, cause the mobility management entity to:
determine that both a duration in which a user equipment does not access a basic registration area in a registration area of the user equipment and a duration in which the user equipment does not initiate a periodic basic registration area update procedure are greater than or equal to a preset duration when the processor does not receive, in a preset duration starting from a time when the processor allocates the registration area to the user equipment, a signaling message sent by the user equipment in the basic registration area or a periodic basic registration area update request message sent by the user equipment,
generate a new registration area for the user equipment, wherein the new registration area does not comprise the basic registration area, and
send the new registration area to the user equipment.

9. The mobility management entity according to claim 8, wherein the instructions, when executed by the processor, cause the mobility management entity to:
delete the basic registration area from the registration area to obtain the new registration area.

10. The mobility management entity according to claim 8, wherein the user equipment does not initiate a periodic basic registration area update procedure when:
the user equipment is in a connected state; or
the user equipment switches between a connected state and an idle state.

11. A mobility management entity, comprising:
a processor; and
memory coupled to the processor, the memory comprising instructions that, when executed by the processor, cause the mobility management entity to:
determine that both a duration in which a user equipment does not access a basic registration area in a registration area of the user equipment and a duration in which the user equipment does not initiate a periodic basic registration area update procedure are greater than or equal to a preset duration by starting a timer when the processor allocates the registration area to the user equipment, and when the processor does not receive, from a time when the timer is started to a time when a timing duration of the timer reaches the preset duration, a signaling message sent by the user equipment in the basic registration area or the periodic basic registration area update request message sent by the user equipment,
generate a new registration area for the user equipment, wherein the new registration area does not comprise the basic registration area, and
send the new registration area to the user equipment.

12. The mobility management entity according to claim 11, wherein the instructions, when executed by the processor, cause the mobility management entity to:
restart the timer when the timing duration of the timer reaches the preset duration.

13. The mobility management entity according to claim 11, wherein the instructions, when executed by the processor, cause the mobility management entity to:
delete the basic registration area from the registration area to obtain the new registration area.

14. The mobility management entity according to claim 11, wherein the user equipment does not initiate a periodic basic registration area update procedure when:
the user equipment is in a connected state; or
the user equipment switches between a connected state and an idle state.

* * * * *